US008909959B2

(12) United States Patent
Yang

(10) Patent No.: US 8,909,959 B2
(45) Date of Patent: Dec. 9, 2014

(54) VOLTAGE ADJUSTMENT CIRCUIT FOR STORAGE MEDIA

(75) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 13/559,210

(22) Filed: Jul. 26, 2012

(65) Prior Publication Data

US 2013/0044388 A1 Feb. 21, 2013

(51) Int. Cl.

*G06F 1/26* (2006.01)
*G06F 1/32* (2006.01)
*G11B 19/02* (2006.01)

(52) U.S. Cl.

CPC .............. *G06F 1/3268* (2013.01); *G11B 19/02* (2013.01); *Y02B 60/1246* (2013.01)
USPC .......................................... 713/320; 713/300

(58) Field of Classification Search

CPC ... G06F 1/3268; G11B 19/02; Y02B 60/1246
USPC .................................................. 713/300, 320
See application file for complete search history.

(56) References Cited

U.S. PATENT DOCUMENTS 5,218,691 A * 6/1993 Tuma et al. ..................... 703/24
6,415,349 B1 * 7/2002 Hull et al. ..................... 711/100
2009/0100216 A1 * 4/2009 Han et al. ..................... 711/103

* cited by examiner

*Primary Examiner* — Mark Connolly
(74) *Attorney, Agent, or Firm* — Novak Druce Connolly Bove + Quigg LLP

(57) ABSTRACT

A voltage adjustment circuit for a storage medium includes a storage medium interface, a storage medium control chip, and a switch module. When the storage medium is read or written to by the storage medium control chip, the storage medium control chip transmits a pair of differential signals to the storage medium interface so that the switch module can control a power supply to power the storage medium. And the switch module will control the power supply not to power the storage medium when the storage medium control chip does not operate to read or write the storage medium.

11 Claims, 1 Drawing Sheet

VCC L1 L2 L3 L4 TX_P TX_N RX_P RX_N 40 30 2 3 6 7 4 5 storage medium interface storage medium 60 70 C3 R11 C4 R12 C5 C6 R13 50 P5V P12V R1 R2 R3 R4 R5 R6 R7 R8 R9 R10 Q1 Q2 Q3 Q4 Q5 Q6 C1 C2 100

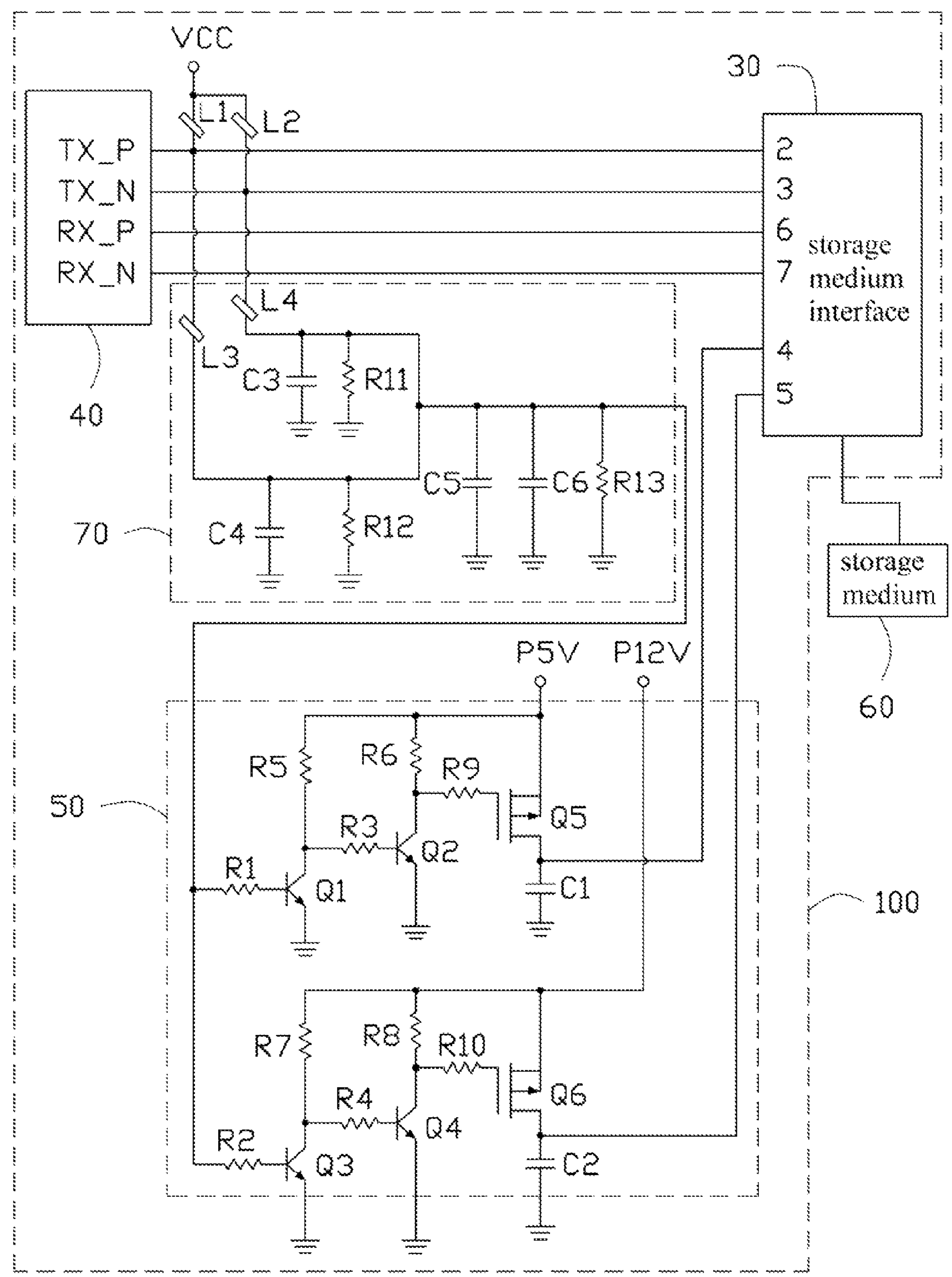
VCC
L1
L2
TX_P
TX_N
RX_P
RX_N
30
2
3
6
7
storage medium interface
4
5
L4
L3
C3
R11
40
C5
C6
R13
70
C4
R12
storage medium
60
P5V
P12V
R5
R6
R9
50
Q5
R3
Q2
R1
Q1
C1
100
R7
R8
R10
Q6
R4
Q4
R2
Q3
C2

VOLTAGE ADJUSTMENT CIRCUIT FOR STORAGE MEDIA

BACKGROUND

1. Technical Field

The present disclosure relates to a voltage adjustment circuit for storage media.

2. Description of Related Art

In order to store a lot of data, a plurality of hard disks are installed in a server. Much energy is consumed when the hard disks are read, written, or read and written at the same time. In addition, some energy is also consumed when the hard disks are in the idle state. Therefore, the energy consumption of the hard disks should be controlled for energy saving.

Therefore, there is need for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The FIGURE is a circuit diagram of an embodiment of a voltage adjustment circuit connected to a storage medium of the present disclosure.

DETAILED DESCRIPTION

As shown in the FIGURE, a voltage adjustment circuit 100 in an embodiment controls an operating voltage input to a storage medium 60 according to the data transmitting state of the storage medium 60. In this embodiment, the voltage adjustment circuit 100 includes a storage medium interface 30, a storage medium control chip 40, and a switch module 50. In an embodiment, the storage medium 60 is a hard disk, the storage medium interface 30 is a hard disk interface and the storage medium control chip 40 is a hard disk control chip.

The storage medium interface 30 includes first and second signal pins 2 and 3, and first and second power pins 4 and 5. In an embodiment, the storage medium interface 30 is a serial attached small computer system interface (SCSI) (SAS) interface and connected to the storage medium 60 through a SAS connector.

The storage medium control chip 40 includes third, fourth, fifth and sixth signal pins TX_P, TX_N, RX_P and RX_N. The third signal pin TX_P is connected to the first signal pin 2 and connected to a direct current (DC) power unit VCC through a first ferrite bead L1. The fourth signal pin TX_N is connected to the second signal pin 3 and connected to the DC power unit VCC through a second ferrite bead L2. The fifth signal pin RX_P is connected to a seventh signal pin 6 of the storage medium interface 30 and the sixth signal pin RX_N is connected to an eighth signal pin 7 of the storage medium interface 30. When the storage medium control chip 40 is operated to read/write the storage medium 60, the third and the fourth signal pins TX_P and TX_N transmit a pair of differential signals to the first and the second signal pins 2 and 3. When the storage medium control chip 40 is not operated to read/write the storage medium 60, the third and the fourth signal pins TX_P and TX_N do not transmit the pair of differential signals. In an embodiment, the storage medium control chip 40 is a SAS control chip.

The switch module 50 includes a first to a fifth terminals. The first terminal is connected to the DC power unit VCC for receiving a first level signal output by the DC power unit VCC and to the third and the fourth signal pins TX_P and TX_N for receiving a second level signal. In this embodiment, the first level signal is a high level signal, and the second level signal is a low level signal of a signal superposed from two parts of the pair of differential signals. The second terminal is connected to a first power unit P5V, the third terminal is connected to a second power unit P12V, the fourth terminal is connected to the first power pin 4, and the fifth terminal is connected to the second power pin 5. When a received signal of the first terminal is the low level signal, the switch module 50 controls the first and the second power units P5V and P12V to supply power to the storage medium interface 30 to provide the operating voltage for the storage medium 60. When a received signal of the first terminal is the high level signal, the first and the second power units P5V and P12V are controlled by the switch module 50 to not supply power to the storage medium interface 30. Thus, the first and the second power units P5V and P12V are used as a power supply unit for the storage medium 60. In the embodiment, the high level signal is a signal with a high potential, and the low level signal is a signal with a low potential.

The switch module 50 further includes two capacitive elements, six electronic switches, and ten resistance elements. In this embodiment, the two capacitive elements are a first and a second capacitor C1 and C2, the six electronic switches are a first to a fourth transistors Q1-Q4 and a first and a second field-effect transistor (FET) Q5 and Q6, and the ten resistance elements are a first to a tenth resistors R1-R10.

A base of the first transistor Q1 is connected to a base of the third transistor Q3 through the first and the second resistors R1 and R2. A first node between the first and the second resistors R1 and R2, i.e. the first terminal, is connected to the third and fourth signal pins TX_P and TX_N and the DC power unit VCC. A base of the second transistor Q2 is connected to a collector of first transistor Q1 through the third resistor R3, and a base of the fourth transistor Q4 is connected to a collector of the third transistor Q3 through the fourth resistor R4. Each emitter of the first, the second, the third and the fourth transistor Q1-Q4 is grounded. A second node, i.e. the second terminal, is connected to the collector of the first transistor Q1 through the fifth resistor R5, to a collector of the second transistor Q2 through the sixth resistor R6, and to the first power unit P5V. A third node, i.e. the third terminal, is connected to the collector of the third transistor Q3 through the seventh resistor R7, to a collector of the fourth transistor Q4 through the eighth resistor R8, and to the second power unit P12V. A gate of the first FET Q5 is connected to the collector of the second transistor Q2 through the ninth resistor R9 and a gate of the second FET Q6 is connected to the collector of the fourth transistor Q4 through the tenth resistor R10. A source of the first FET Q5 is connected to the first power unit P5V, and a source of the second FET Q6 is connected to the second power unit P12V. A drain of the first FET Q5 is connected to the first power pin 4 and grounded through the first capacitor C1. A drain of the second FET Q6 is connected to the second power pin 5 and grounded through the second capacitor C2.

In the embodiment, the high level signal is a signal with a high potential, and the low level signal is a signal with a low potential, wherein a voltage between the high potential and a ground potential is larger than each of threshold voltages of the first to fourth transistors Q1-Q4, a voltage between the high potential and each of potentials of the first and second power units P5V and P12V is smaller than each of threshold voltages of the first and second FETs Q5-Q6, a voltage between the low potential and the ground potential is smaller than each of threshold voltages of the first to fourth transistors Q1-Q4, and a voltage between the low potential and each of potentials of the first and second power units P5V and P12V is larger than each of threshold voltages of the first and second FETs Q5-Q6.

In an embodiment, the voltage adjustment circuit 100 further includes a filtering module 70, wherein the filtering module 70 further includes two ferrite beads, four capacitive elements and three resistance elements. In this embodiment, the two ferrite beads are third and fourth ferrite beads L3 and L4, the fourth capacitive elements are a third to a sixth capacitors C3-C6, and the three resistance elements are eleventh, twelfth and thirteenth resistors R11-R13. An end of the third capacitor C3 and an end of the eleventh resistor R11 are connected to the fourth signal pin TX_N through the fourth ferrite bead L4, and the other end of the third capacitor C3 and the other end of the eleventh resistor R11 are grounded. An end of the fourth capacitor C4 and an end of the twelfth resistor R12 are connected to the third signal pin TX_P through the third ferrite bead L3, and the other end of the fourth capacitor C4 and the other end of the twelfth resistor R12 are grounded. An end of the fifth capacitor C5, an end of the six capacitor C6 and an end of the thirteenth resistor R13 are connected to the signal pins TX_N and TX_P, and the other end of the fifth capacitor C5, the other end of the six capacitor C6 and the other end of the thirteenth resistor R13 are grounded. The filtering module 70 is only utilized for filtering. Therefore, in other embodiments, the filtering module 70 is not necessary.

An operating principle of the embodiment of the present disclosure is described as follows.

When the storage medium 60 is read, written, or read and written at the same time by the storage medium control chip 40, the third and the fourth signal pins TX_P and TX_N of the storage medium control chip 40 transmit a pair of differential signal to the storage medium interface 30. A low level signal in a signal superposed by the two parts of the pair of differential signal is transmitted to the bases of the first and the third transistors Q1 and Q3 so that both of the first and the third transistors Q1 and Q3 are cut off. Therefore, the bases of the second and the fourth transistors Q2 and Q4 respectively receive the potentials of the first and the second power units P5V and P12V. At this time, both of the second and the fourth transistors Q2 and Q4 are turned on so that the gates of the first and the second FETs Q5 and Q6 receive the ground potential. Since the sources of the first and the second FETs Q5 and Q6 respectively receive the potentials of the first and the second power units P5V and P12V, the gate to source voltages of the FETs Q5 and Q6 are negative voltages. However, each of the first and the second FETs Q5 and Q6 is P-channel MOSFET having negative threshold voltage, wherein the P-channel MOSFET is turned on when gate to source voltage of the P-channel MOSFET is negative and absolute value of the gate to source voltage is larger than absolute value of the negative threshold voltages. Therefore, although the gate to source voltages of the FETs Q5 and Q6 are respectively smaller than the threshold voltages of the FETs Q5 and Q6, absolute values of the gate to source voltages of the FETs Q5 and Q6 are still respectively larger than absolute values of the threshold voltages of the FETs Q5 and Q6. Thus, both of the first and the second FETs Q5 and Q6 are turned on so that the first power unit P5V can supply power to the first power pin 4 through the first FET Q5 and the second power unit P12V can supply power to the second power pin 5 through the second FET Q6.

Thereby, the operating voltage can be provided to the storage medium 60 for reading/writing.

When the storage medium control chip 40 is not operated to read/write the storage medium 60, the pair of differential signals are not transmitted by the third and the fourth signal pins TX_P and TX_N of the storage medium control chip 40 so that the first terminal receives the potential of the DC power unit VCC. Therefore, the high level signal is received by the bases of the first and the third transistors Q1 and Q3 so that both of the first and the third transistors Q1 and Q3 are turned on. Then, the bases of the second and the fourth transistors Q2 and Q4 receive the ground potential. At this time, both of the second and the fourth transistors Q2 and Q4 are cut off so that the gates of the first and the second FETs Q5 and Q6 respectively receive the potentials of the first and the second power units P5V and P12V. Since the sources of the first and the second FETs Q5 and Q6 also respectively receive the potentials of the first and the second power units P5V and P12V, the absolute values of the gate to source voltages of the FETs Q5 and Q6 are respectively smaller than the absolute values of the threshold voltages of the FETs Q5 and Q6. Thus, both of the first and the second FETs Q5 and Q6 are cut off so that the first and the second power units P5V and P12V cannot supply power to the first and the second power pins 4 and 5. Thereby, the switch module controls the first and the second power units P5V and P12V to supply or not to supply power to the storage medium interface 30. Accordingly, the energy consumption of the storage medium 60 can be decreased.

From the above discussion, the first, the second, the third and the fourth transistors Q1-Q4 and the first and the second FETs Q5-Q6 are used as electronic switches in this embodiment. Thus, the above transistors and FETs can be replaced by other kinds of transistors or electronic elements with switch function, such as an electronic switch chip.

The above voltage adjustment circuit 100 can operate when the storage medium 60 is in the idle state so that the power unit cannot supply power to the storage medium 60. Thus, the energy consumption of the storage medium 60 can be decreased for power saving.

While the disclosure has been described by way of example and in terms of various embodiments, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A voltage adjustment circuit for a storage medium, comprising:

- a storage medium interface connecting to the storage medium and comprising a first and a second signal pins;
- a storage medium control chip comprising a third and a fourth signal pins, wherein the third and the fourth signal pins transmit a pair of differential signal to the first and the second signal pins when the storage medium is read/written to by the storage medium control chip; and
- a switch module connecting to a power supply unit and the storage medium interface, and comprising a first terminal, wherein the first terminal is connected to the third and the fourth signal pins and a direct current (DC) power unit for receiving one of a low level signal obtained from the pair of differential signal and a high level signal of the DC power unit, and wherein the power supply unit is controlled by the switch module to supply power to the storage medium interface when the first terminal receives the low level signal, and the power supply unit stops supplying power to the storage medium interface by the switch module when the first terminal receives the high level signal.

2. The voltage adjustment circuit of claim 1, wherein the storage medium is a hard disk, the storage medium control chip is a hard disk control chip, and the storage medium interface is a hard disk interface.

3. The voltage adjustment circuit of claim 2, wherein the hard disk interface is a serial attached small computer system (SAS) interface and the hard disk control chip is a SAS control chip.

4. The voltage adjustment circuit of claim 1, wherein the storage medium interface further comprises a first and a second power pins, the power supply unit further comprises a first and a second power supply units, and the switch module further comprises a second, a third, a fourth and a fifth terminals, and wherein the second terminal is connected to the first power supply unit, the third terminal is connected to the second power supply unit, the fourth terminal is connected to the first power pin, and the fifth terminal is connected to the second power pin.

5. The voltage adjustment circuit of claim 4, wherein the switch module further comprises:

a first and a second capacitive elements;

a first, a second, a third, a fourth, a fifth, a sixth, a seventh, an eighth, a ninth and a tenth resistance elements; and a first, a second, a third, a fourth, a fifth and a sixth electronic switches, each of the electronic switches further comprises a first, a second and a third end;

wherein the third ends of the first, the second, the third and the fourth electronic switches are grounded, the third end of the fifth electronic switch is connected to the first power pin and grounded through the first capacitive element, and the third end of the sixth electronic switch is connected to the second power pin and grounded through the second capacitive element;

wherein the first end of the first electronic switch is connected to the first end of the third electronic switch through the first and the second resistance elements, a node between the first and the second resistance elements is connected to the first and the second signal pins and the DC power unit, the first end of the second electronic switch is connected to the second end of the first electronic switch through the third resistance element, the first end of the fourth electronic switch is connected to the second end of the third electronic switch through the fourth resistance element, the first end of the fifth electronic switch is connected to the second end of the second electronic switch through the ninth resistance element, and the first end of the sixth electronic switch is connected to the second end of the fourth electronic switch through the tenth resistance element; and wherein the second end of the first electronic switch is connected to the first power supply unit through the fifth resistance element, the second end of the second electronic switch is connected to the first power supply unit through the sixth resistance element, the second end of the third electronic switch is connected to the second power supply unit through the seventh resistance element, the second end of the fourth electronic switch is connected to the second power supply unit through the eighth resistance element, the second end of the fifth electronic switch is connected to the first power supply unit, and the second end of the sixth electronic switch is connected to the second power supply unit.

6. The voltage adjustment circuit of claim 5, wherein the first to the fourth electronic switches are transistors, each of the first ends of the transistors is a base, each of the second ends of the transistors is a collector, and each of the third ends of the transistors is an emitter.

7. The voltage adjustment circuit of claim 5, wherein the fifth and the sixth electronic switches are field-effect transistors (FETs), each of the first ends of the FETs is a gate, each of the second ends of the FETs is a source, and each of the third ends of the FETs is a drain.

8. The voltage adjustment circuit of claim 4, wherein the first and the second power supply units are controlled by the switch module to supply power to the storage medium interface.

9. The voltage adjustment circuit of claim 1, further comprising a filtering module including a third, a fourth, a fifth and a sixth capacitive elements and an eleventh, a twelfth and a thirteenth resistance elements, each of the third, the fourth, the fifth and the sixth capacitive elements and the eleventh, the twelfth and the thirteenth resistance elements comprise a first and a second ends, wherein the first ends of the third capacitive element and the eleventh resistance element are connected to the first signal pin, the second ends of the third capacitive element and the eleventh resistance element are grounded, the first ends of the fourth capacitive element and the twelfth resistance element are connected to the second signal pin, the second ends of the fourth capacitive element and the twelfth resistance element are grounded, the first ends of the fifth and the sixth capacitive elements and the thirteenth resistance element are connected to the first and the second signal pins, and the second ends of the fifth and the sixth capacitive elements and the thirteenth resistance element are grounded.

10. A voltage adjustment circuit for a storage medium, comprising:

a storage medium interface connecting to the storage medium;

a storage medium control chip connecting to the storage medium interface and transmitting a differential signal to the storage medium interface when the storage medium is read written to by the storage medium control chip; and a switch module connecting to a first power unit for receiving a first level signal transmitted from the first power unit, to the storage medium control chip for receiving a second level signal obtained from the differential signal, and to a second power unit for controlling the second power unit to supply power, wherein the second power unit is controlled to supply power to the storage medium interface when the switch module receives the second level signal, and the second power unit stops supplying power to the storage medium interface by the switch module when the switch module receives the first level signal.

11. The voltage adjustment circuit of claim 10, wherein the first level signal is a high level signal and the second level signal is a low level signal.

* * * * *